3,560,534
TRANSVINYLATION USING MERCURIC ACETATE/PERCHLORIC ACID CATALYST

John M. MacDonald, Sarnia, Ontario, Canada, assignor to Esso Research and Engineering Company, a corporation of Delaware
No Drawing. Filed Aug. 1, 1967, Ser. No. 657,525
Int. Cl. C11c 3/10
U.S. Cl. 260—410.9                    6 Claims

ABSTRACT OF THE DISCLOSURE

Vinyl acetate is reacted with $C_3$ to $C_{30}$ acid in a transvinylation reaction using a combination of mercuric salt and perchloric acid as catalyst.

FIELD OF THE INVENTION

The present invention involves reacting vinyl acetate with a $C_3$ to $C_{30}$ monocarboxylic acid in the presence of a catalyst system of mercuric salt and perchloric acid to form the vinyl ester of the $C_3$ to $C_{30}$ acid by a transvinylation process.

DESCRIPTION OF THE PRIOR ART

While vinyl acetate is widely used commercially as a monomer in various polymerization reactions (e.g. see U.S. Pat. 3,048,479 describing a fuel oil additive prepared by copolymerizing ethylene and vinyl acetate) vinyl esters of higher monocarboxylic acids are not commercially available at costs which would permit their widespread use. Thus, in U.S. Pats. 3,048,479 and 3,236,612, the use of these higher vinyl esters copolymerized with ethylene has been shown to form useful fuel oil additives, but the present cost of the higher vinyl esters is a hindrance to their widespread use. Unfortunately, the commercial methods used to prepare vinyl acetate at a low cost do not apply to making the higher vinyl esters. For example, vinyl acetate is commercially prepared by reacting acetic acid with acetylene in the vapor phase over a zinc acetate on charcoal catalyst in the Reppe process, or by oxidation of ethylene to vinyl acetate in the presence of acetic acid as a solvent, a noble metal catalyst and oxygen. These processes have been described in U.S. Pat. 2,066,075, British Pat. 1,036,674 and Canadian Pat. 756,632. While these methods give low cost vinyl acetate, they are not used to form vinyl esters of the higher fatty acids. Traditionally, these higher vinyl esters have been prepared from vinyl acetate by transvinylation. The best prior catalyst known to the present inventor for this transvinylation reaction was a combination of mercuric acetate, and sulfuric acid as disclosed in the article by R. L. Adelman, Journal of Organic Chemistry, 14, 1057 (1949), in which it is assumed that mercuric sulfate is formed in situ to serve as the catalyst. This process usually requires about 2 wt. percent of mercuric acetate and about 0.5 wt. percent sulfuric acid, said wt. percents being based on the wt. percent of the $C_3$ to $C_{30}$ fatty acid reactant. The mercuric acetate is not recovered since it decomposes into mercury (although the mercury can be recovered) when the reaction product is distilled in order to purify the vinyl ester product. Because of the current relatively high cost of mercuric acetate, which is on the order of $6.00 to $8.00 per pound as compared to about $4.00 per pound for mercury, this becomes a relatively expensive method which has inhibited its use.

SUMMARY OF THE INVENTION

The present invention is based upon the finding that by substituting perchloric acid, in place of all or part of the aforesaid sulfuric acid, that the amount of mercuric salt necessary to effect the transvinylation conversion is drastically reduced with an attendant large saving in catalyst cost. Analogy to the aforesaid Adelman article would indicate mercuric perchlorate is formed in situ to serve as catalyst. However, this may not be the actual case since the mercuric salt and perchloric acid need not be added in equimolar quantities and the preformed mercuric salts are not nearly as active as when the mercuric acetate and perchloric acid are added separately.

The monocarboxylic acids which can be reacted with vinyl acetate are the $C_3$ to $C_{30}$, preferably $C_5$ to $C_{20}$, monocarboxylic acids, which can be saturated or unsaturated, straight chain or branched chain aliphatic, and which my have other substituents such as aryl, cycloalkyl, halogen, etc. on the hydrocarbon chain. Specific examples of such acids include saturated fatty acids such as butyric acid, caproic acid, caprylic acid, pelargonic acid, lauric acid, palmitic acid, stearic acid, behenic acid, etc. Unsaturated acids that can be used include acrylic acid, crotonic acid, tiglic acid, tetracrylic acid, oleic acid, elaidic acid, erucic acid, etc. Also, di- and tri- unsaturated acids such as linoleic and linolenic acids can be used. Examples of substituted acids which are operable and which do not interfere with the transvinylation reaction include any of the above acids substituted with hydroxy groups such as 12-hydroxy stearic.

The mercuric salts that can be used include those of carboxylic acids, e.g. $C_1$ to $C_{30}$, preferably $C_2$ to $C_5$ fatty acids, and inorganic mineral acids. Some specific salts are mercuric acetate, mercuric butyrate, mercuric laurate, mercuric stearate, mercuric oleate, mercuric chloride, mercuric sulfate, mercuric nitrate, mercuric phosphate, etc. Mercuric acetate is preferred.

The transvinylation reaction is preferably carried out using a lage excess of vinyl acetate, for example 2 to 10, preferably 4 to 8 moles of vinyl acetate per mole of the monocarboxylic acid. The reaction can be carried out at about 50 to 200° F., but preferably 50 to 100° F. is used. These relatively low temperatures are preferred to minimize the formation of ethylidene diesters which tend to occur at higher temperatures. Within the range of about 0.001 to 2 wt. percent of mercuric salt and about 0.001 to 1 wt. percent (as 100% active ingredient) of perchloric acid, will be generally used as catalysts, said weight percents being based on the weight of the aforesaid $C_3$ to $C_{30}$ monocarboxylic acid added to the reaction vessel. Preferred proportions are within the range of .005 to .7 wt. percent mercuric salt, and .005 to 0.3 wt. percent perchloric acid. Generally about .5 to 40, preferably 2 to 10 parts by weight of mercuric salt will be used per part by weight of 100% perchloric acid. The reaction is carried out by simply mixing the components together. The reaction time will generally be about 1 to 100 hours, usually 2 to 10 hours. The reaction can then be terminated by adding sufficient base, e.g. sodium or potassium acetate, sodium carbonate, etc. to neutralize the perchloric acid. The reaction product can then be distilled under reduced pressure of about 20 to 700 mm./Hg to remove the excess vinyl acetate and acetic acid in the overhead. Further distillation under high vacuum, e.g. 0.01 to 5 mm./Hg pressure can be used to remove the desired higher vinyl ester overhead. In some cases, for example to maintain the reaction mixture liquid without using excess heat, it may be desirable to use an inert solvent, e.g. a hydrocarbon such as benzene. However, for the particular reaction conditions of the following examples, no solvent was necessary. Also, the perchloric acid will usually be added last to the reaction vessel aready containing the other ingredients while stirring. Generally, the perchloric acid will be added in the form of an aqueous solution of 40 to 70 wt. percent perchloric acid.

The invention will be further understood by reference to the following examples which include preferred embodiments of the invention:

Example I-A 200 grams (1 mole) of lauric acid, 516 grams (6 moles) of vinyl acetate, and 0.4 gram of mercuric acetate of vinyl acetate, and 0.4 gram of mercuric acetate $Hg(C_2H_3O_2)_2$, were added to a flask. Then 0.1 gram of a concentrated aqueous perchloric acid solution consisting of 70 wt. percent perchloric acid and 30 wt. percent water was added while stirring. The mixture was stirred at 75° F. until homogeneous, which took about 30 minutes. No external heating was necessary during this 30 minute period since the reaction mass remained liquid. The reaction mixture was then left at about 75° F. for a total of about 48 hours. Then 0.1 gram of potassium acetate was added to neutralize the perchloric acid and end the reaction. The reaction mixture was next subjected to distillation at a reduced pressure and a temperature of about 140° F. in the overhead which resulted in removing the excess vinyl acetate and acetic acid which forms as a by-product of the reaction. Following this, the pressure was further reduced to 0.2 to 0.25 mm. Hg and 183 grams of vinyl laurate were collected overhead between 170° F. to 200° F. The distillation was then terminated leaving a residue of unreacted lauric acid in the still bottoms. The vinyl laurate collected overhead represented a yield of 81 wt. percent based on the starting lauric acid.

Example I-B

In comparison, Example I-A above was duplicated, but using the prior art method of concentrated sulfuric acid with the mercuric acetate. This example was carried out as follows: 200 grams of lauric acid, 516 grams of vinyl acetate, 0.4 gram of mercuric acetate and 0.1 gram of concentrated sulfuric acid (98% sulfuric acid and 2% water) was stirred vigorously together under a heat lamp (the heat lamp was necessary as otherwise the reaction mixture sets to a gel and cannot be easily stirred) which keeps the temperature of the reaction mixture at about 75° F. After about one hour of stirring, a homogeneous reaction mixture was obtained which was then left at about 75° F. for a total of 48 hours reaction time. At the end of this time, 0.15 gram of potassium acetate was added to neutralize the sulfuric acid. The reaction mass was then subjected to distillation under a reduced pressure and a temperature of about 140° F. in the overhead which removed the vinyl acetate and acetic acid. The residue was then subjected to a higher vacuum, namely, a pressure of 0.75–0.85 mm. of Hg and the temperature raised to 240–260° F. in the overhead in order to remove the vinyl laurate product. About 82 grams of vinyl laurate were recovered representing a yield of 36 wt. percent based upon the starting lauric acid. The catalyst efficiency was 217 grams of vinyl laurate per gram of mercuric acetate.

Examples II to V

Each of these examples consisted of two parts, namely an A part which was carried out according to the method of Example I-A and a B part which was carried out according to the method of Example I-B, except that variations in time of reaction and/or catalyst concentrations were made.

Example VI-A

Example I-A was repeated but using one-tenth the amount of catalyst.

The results obtained from the preceding examples, and the pertinent reaction conditions are summarized in the following table:

TABLE I

| Variables | I A | I B | II A | II B | III A | III B | IV A | IV B | V A | V B | VI A |
|---|---|---|---|---|---|---|---|---|---|---|---|
| Mercuric acetate, gm | 0.4 | 0.4 | 0.4 | 4 | 0.4 | 4 | 0.4 | 4 | 0.2 | 0.2 | .04 |
| Perchloric acid (70%), gm | 0.1 | | 0.1 | | 0.1 | | 0.1 | | 0.05 | | .01 |
| Sulfuric acid (98%), gm | | 0.1 | | 1.0 | | 1.0 | | 1.0 | | .05 | |
| Reaction time, hours | 48 | 48 | 48 | 48 | 4 | 4 | 2 | 2 | 4 | 4 | 4 |
| Vinyl laurate, gm | 183 | 82 | 186 | 168.2 | 186.1 | 143.8 | 179.1 | 83.8 | 191.9 | 0 | 147.4 |
| Purity of vinyl laurate, percent | | | 98.2 | 99.8 | 99.3 | 99.0 | 99.0 | 97.7 | 99.8 | | 99.4 |
| Yield (percent on lauric acid) | 81 | 36 | 80.9 | 74.3 | 81.7 | 63.1 | 78.5 | 36.2 | 84.7 | | 64.9 |
| Vinyl laurate, gm./mercuric acetate, gm | 457 | 217 | 456 | 42.0 | 462 | 35.6 | 443 | 20.5 | 957 | | 3,660 |

*All examples ran using 200 gm. lauric acid, 516 gm. vinyl acetate.

As seen by comparing Examples I-A and I-B of the preceding table, the use of .07 (70%×0.1) gram of perchloric acid as compared to 0.1 gram of sulfuric acid, under the same reaction times, resulted in a considerably higher yield of the vinyl laurate, i.e. 81% versus 36%, and about twice the yield of vinyl laurate per gram of mercuric acetate, i.e. 457 grams versus 217 grams. Examples II to IV all showed that the perchloric acid was more effective than the sulfuric acid, and gave higher yields of the vinyl laurate, even though only a tenth as much of catalyst was required. Also, Example IV-A shows that in the presence of perchloric acid the rate of the reaction is so high that a 78.5% yield of vinyl laurate is reached in only 2 hours. With the same amount of sulfur acid as the promoter, the reaction has only reached a 36% yield after 48 hours as shown by I-B. Example V, shows that even as little as .05% perchloric acid was effective, while this amount of sulfuric acid did not give any significant reaction at all. Example VI shows lowering the amount of the 70% perchloric concentrate to 0.01 wt. percent gave a yield of about 64.9% of vinyl laurate employing a reaction time of 4 hours. All the examples of the table consistently demonstrate the superiority of perchloric acid.

Zinc, lead and cupric acetates in place of the mercuric acetate, were also tested, but did not act as transvinylation catalysts in the presence of perchloric acid. A mixture of 80% cupric acetate/20% mercuric acetate at the 0.1 wt. percent level did have activity; however, this activity was about equivalent to mercuric acetate at the 0.04 wt. percent level, thereby indicating that only the mercuric acetate was the active component.

What is claimed is:

1. A transvinylation process which comprises reacting vinyl acetate with $C_3$ to $C_{30}$ monocarboxylic acid using a catalytic amount of mercuric salt catalyst and perchloric acid.

2. A process according to claim 1, wherein said monocarboxylic acid is a $C_5$ to $C_{20}$ fatty acid, said mercuric salt is mercuric salt of a carboxylic acid, and about 0.5 to 40 parts by weight of said mercuric salt is used per part by weight of said perchloric acid.

3. A process according to claim 2, wherein said mercuric salt is mercuric acetate.

4. A process according to claim 3, wherein said $C_5$ to $C_{20}$ fatty acid is lauric acid, and about 2 to 10 parts by weight of said mercuric salt is used per part by weight of said perchloric acid.

5. A transvinylation process which comprises reacting about 2 to 10 molar proportions of vinyl acetate per molar proportion of a $C_3$ to $C_{30}$ monocarboxylic acid at a temperature of 50 to 200° F. using as a catalyst within the range of about 0.001 to 2 wt. percent mercuric salt and within the range of about 0.001 to 1 wt. percent of perchloric acid, said wt. percent being based on the weight of said monocarboxylic acid, in a relative weight ratio of about .5 to 40 parts by weight of mercuric salt per part by weight of perchloric acid, for about 1 to 100 hours, neutralizing said perchloric acid to stop the reaction, removing excess vinyl acetate and acetic acid by distillation, and then recovering vinyl ester of said $C_3$ to $C_{30}$ monocarboxylic acid by further distillation.

6. A transvinylation process which comprises reacting about 4 to 8 molar proportions of vinyl acetate per molar proportion of lauric acid at a temperature of about 50 to 100° F. for about 2 to 10 hours in the presence of about .005 to 0.7 wt. percent of mercuric acetate and about .005 to 0.3 wt. percent perchloric acid, said wt. percent being based on the weight of lauric acid, neutralizing the perchloric acid to stop the reaction and recovering vinyl laurate from the reaction mixture.

References Cited

UNITED STATES PATENTS

| 2,042,221 | 5/1936 | Groll et al. | 260—410.9 |
| 2,299,862 | 10/1942 | Toussaint et al. | 260—410.9 |
| 2,646,437 | 7/1953 | Dickey et al. | 260—410.9 |

OTHER REFERENCES

Elder et al.. Textbook of Chemistry, Rvd. ed., 1948, pp. 349–50.

LORRAINE A. WEINBERGER, Primary Examiner

R. S. WEISSBERG, Assistant Examiner

U.S. Cl. X.R.

260—491